(12) United States Patent
Bobrov et al.

(10) Patent No.: US 7,110,618 B2
(45) Date of Patent: Sep. 19, 2006

(54) DIGITAL IMAGE ANALYSIS OF REFLECTING MARKERS

(75) Inventors: Paul Bobrov, Minsk (BY); Georg Wiora, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 716 days.

(21) Appl. No.: 10/232,075

(22) Filed: Aug. 29, 2002

(65) Prior Publication Data

US 2003/0128894 A1 Jul. 10, 2003

(30) Foreign Application Priority Data

Aug. 31, 2001 (DE) ................................ 101 42 457

(51) Int. Cl.
*G06K 9/36* (2006.01)
(52) U.S. Cl. ..................................... 382/288
(58) Field of Classification Search ................ 382/103, 382/151, 154, 168, 172, 173, 181, 209, 218, 382/232, 245, 246, 287, 288, 291, 306; 341/50, 341/59, 67; 348/42, 50, 94; 356/601, 620; 396/89, 510; 250/558, 208.1; 375/240.01
See application file for complete search history.

(56) References Cited

U.S. PATENT DOCUMENTS

| | | | | |
|---|---|---|---|---|
| 3,783,249 A | * | 1/1974 | Koper | ................. 250/558 |
| 5,072,249 A | * | 12/1991 | Yoshida | ................. 396/510 |
| 5,995,765 A | * | 11/1999 | Kaneko et al. | ............... 396/89 |
| 6,556,722 B1 | * | 4/2003 | Russell et al. | .............. 382/291 |
| 6,826,299 B1 | * | 9/2003 | Brown et al. | ............... 382/154 |
| 6,650,764 B1 | * | 11/2003 | Wakashiro | ................. 382/103 |
| 6,664,531 B1 | * | 12/2003 | Gartner et al. | ........... 250/208.1 |
| 6,766,036 B1 | * | 7/2004 | Pryor | ........................ 382/103 |
| 6,901,161 B1 | * | 5/2005 | Wakashiro | ................. 382/154 |
| 2003/0128894 A1 | * | 7/2003 | Bobrov et al. | ............. 382/288 |
| 2005/0168756 A1 | * | 8/2005 | Massen | ...................... 356/601 |

* cited by examiner

*Primary Examiner*—Amir Alavi
(74) *Attorney, Agent, or Firm*—Akerman Senterfitt; Stephan A. Pendorf

(57) ABSTRACT

The subject of the invention is a system for photogrammetric determination of centers of gravity of signal markers in moving objects. For reduction of the herein produced image data prior to the actual image measurement in a computer, patterns of adjacent pixels across lines are evaluated in a data reduction step. The various possibilities of light/dark constellations of groups of adjacent pixels serve therein as input signals of an evaluation logic, which is an end automation. Various patterns trigger transitions between the finite conditions of the automation. Depending upon the current condition of the final automation and actual detected pixel patterns the final automation causes varying operations for identification of characteristic features of the signal marks and for data technological combining of the parameters necessary for determining centers of gravity.

14 Claims, 8 Drawing Sheets

Figure 3:
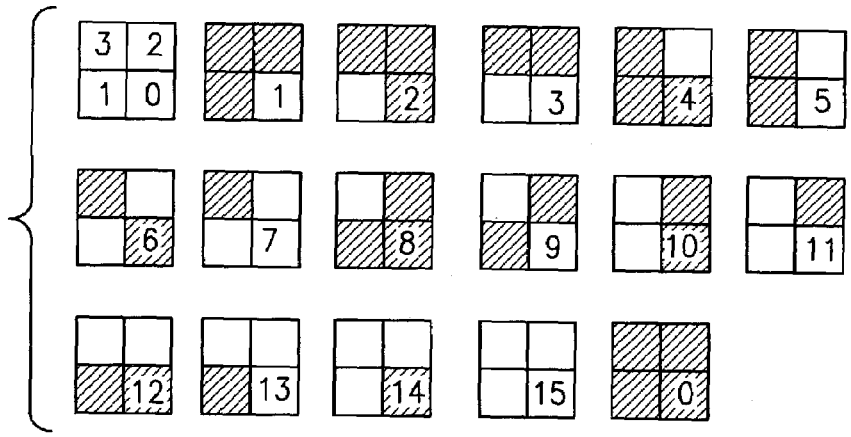

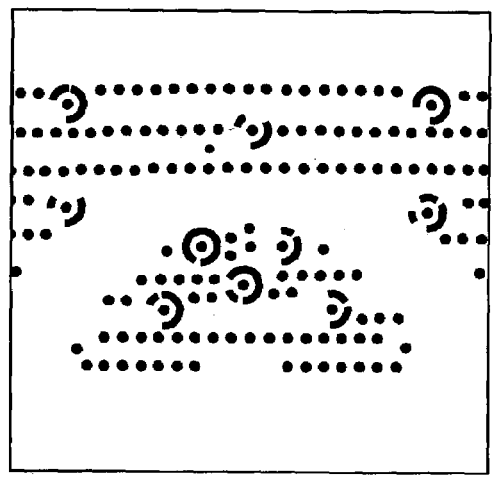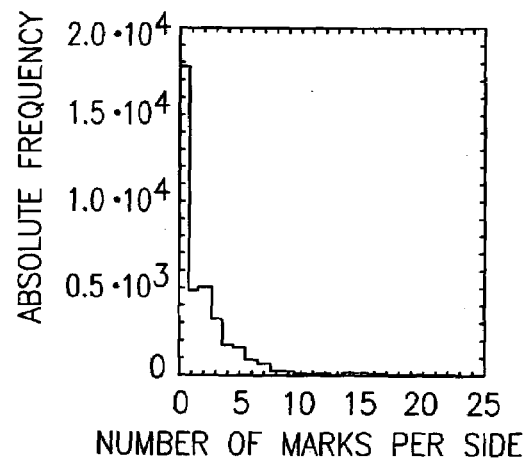
Fig. 1A    Fig. 1B
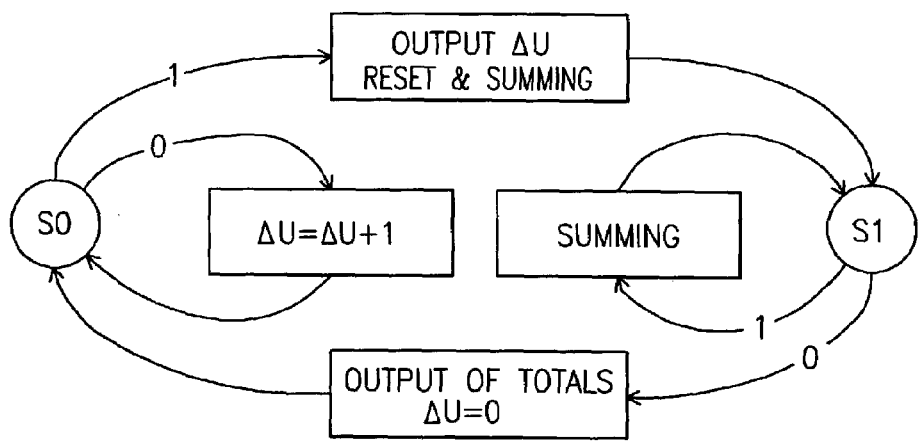
Fig. 2

DIGITAL IMAGE ANALYSIS OF REFLECTING MARKERS

The present invention concerns image recognition systems for identifying particular information content from the image signal of an electronic camera. In particular, the invention concerns the photogrammetric ascertainment of the center of gravity of the optical signal markers in rapidly moving objects.

Systems of this type are employed for example in the analysis of movement patterns of dynamic processes (deformation processing during crash tests, detail studies of motor functions of human movement, etc.). For this, optical signal markers with a specified shape and size (for example circular disks) are applied onto various locations of the object being observed. Therein the surface of this signal marker is typically designed such that it reflects the impinging light in a characteristic manner.

Each of the individual images provided by a video camera at short time intervals, comprised of a multiplicity of linear sequences of individual image points (pixels), must be evaluated with respect to the signal components which are associated with the signal markers. In such an image measurement of retro-reflecting circular signal markers two basic problems must be solved: first, associated fields must be analyzed and characterized and subsequently the center of each area (=center of gravity the signal mark) must be determined. For both problems a purely software based evaluation process is known:

Correlation Analysis

Since retro-reflecting signal markers exhibit a good image contrast, the correlation analysis can be carried out using a binary version (that is, only black/white pixel values) of the respective image. The most complete and at the same time efficient solution of this problem is supplied by the BCC-algorithm (Binary Connected Components) of MANDLER & OBERLANDER (Informatik Fachberichte 254, pages 248–254, Springer 1990). With only one single pass it can determine the edges of all associated fields and their correlation or interrelationship in an image. This applies also for multiple subdivided areas. A special setup for photogrammetry was described by MAAS (Digital Photogrammetry in Three-Dimensional Flow Measurement Technology, PhD thesis, ETH Zurich, 1992).

Point Measurement

If all areas are marked, then a process for measuring of points can be applied to them, as described for example by LUHMANN (Near Area Photogrammetry, Principles of Method Applications, Wichmann Publishers, 2000) or SHORTIS ET AL. (Practical Testing of Precision and Accuracy of Target Image Centering Algorithms, SPIE 2598, pages 65–76, 1995).

In the most simple case one determines the center of gravity (u,v) of the binarized image b as center value of the image coordinates of all points b(u,v)≡1 in the environment of the mark:

$$\bar{u} = \frac{\sum\limits_{u=u_{\min}}^{u_{\max}} \sum\limits_{v=v_{\min}}^{v_{\max}} u \cdot b(u, v)}{\sum\limits_{u=u_{\min}}^{u_{\max}} \sum\limits_{v=v_{\min}}^{v_{\max}} b(u, v)} \quad \bar{v} = \frac{\sum\limits_{u=u_{\min}}^{u_{\max}} \sum\limits_{v=v_{\min}}^{v_{\max}} v \cdot b(u, v)}{\sum\limits_{u=u_{\min}}^{u_{\max}} \sum\limits_{v=v_{\min}}^{v_{\max}} b(u, v)} \quad (1)$$

Another possibility is the calculation of a gray-value weighted center of gravity (Weighted Center of Gravity) of the gray image g according to the formula:

$$\bar{u} = \frac{\sum\limits_{u=u_{\min}}^{u_{\max}} \sum\limits_{v=v_{\min}}^{v_{\max}} u \cdot g(u, v) \cdot b(u, b)}{\sum\limits_{u=u_{\min}}^{u_{\max}} \sum\limits_{v=v_{\min}}^{v_{\max}} g(u, v) \cdot b(u, b)} \quad \bar{v} = \frac{\sum\limits_{u=u_{\min}}^{u_{\max}} \sum\limits_{v=v_{\min}}^{v_{\max}} v \cdot g(u, v) \cdot b(u, b)}{\sum\limits_{u=u_{\min}}^{u_{\max}} \sum\limits_{v=v_{\min}}^{v_{\max}} g(u, v) \cdot b(u, b)} \quad (2)$$

The multiplication with the binarized image b serves for selection of the image point, which is associated with the mark.

More complex is the so-called Template Matching. Therein the cross-correlation k between a predetermined pattern m(u,v) and the image g(u,v) is calculated.

$$k(u', v') = \int_{u_{\min}}^{u_{\max}} \int_{v_{\min}}^{v_{\max}} m(u - u_{\min}, v - v_{\min}) \cdot g(u - u', v - v') dv\, du \quad (3)$$

The maximum of the correlation function k provides the location of the mark center. Since the marks are usually distorted in perspective and appear to have various sizes in the image, it is not sufficient merely to compare them with a pattern or template. One must calculate the correlation with a complete palette of various models and find the result of the "best fit". Thereby the calculation process requires relatively high calculation time. As models, conventionally employed are ellipses or rectangles of various size with various edge sharpness.

Image evaluation processes for identification of the centers of gravity of signal marks using exclusively software solutions are in principle relatively slow, since in the case of high resolution images a very high rate stream of data occurs in rapid sequence, of which the evaluation is appropriately time consuming. An HDTV camera with a resolution 1280×1024 image points and an image rate of 25 images per second provides, for example, an average data rate of 32 million points per second, with a typical transmission rate of 40 million points per second. With the present limitation of PCI-busses for standard computers of around 100 MByte per second this presents a substantial load or demand on the computer architectural even considering only purely the data transmission. In a simultaneous processing—or further, in the case of connection of multiple cameras—a conventional microprocessor with a conventional operating system does not even come into consideration.

In order to estimate the maximal load of a computer, one calculates the number $n_t$ of the clock cycles, available for processing of each image point:

$$n_t = \frac{f}{r_k} \quad (4)$$

with the clock frequency f of the microprocessor and the transmission rate $r_k$ of the camera.

If one uses for $r_k$ the above proposed transmission rate of 40 million image points per second, that is, 40 MHz, and as f 1000 MHz, then there is available for each image point essentially $n_t$=25 clock cycles. This is more rapid for an employment in this area, however is not sufficient for carrying out high-resolution image evaluation. Such a value for $n_t$ should be significantly greater than 1000, in particular when one considers that not all clock cycles are available for processor operation, but rather a part is lost while waiting for hard drive access.

So that the system does not operate at its limits, there should in addition be factored in a generous reserve of $\alpha=50\%$ of the cycles for the simultaneously occurring tasks of the operating system. For the case of a simultaneous operation of c camera the number of clock cycles available per image point is reduced even further:

$$n_t(1-\alpha) \cdot \frac{f}{c \cdot r_k} \quad (5)$$

With this estimation it can be seen, that already prior to a processing in a computer already a drastic reduction of the signal supplied by the camera must occur.

If one solves the equation (5) according to $r_k$, then one can calculate therewith the maximal data rate $r_{max}$, which may be submitted for evaluation in the computer:

$$r_{max} = \frac{f \cdot (1-\alpha)}{c \cdot n_t} \quad (6)$$

Of interest herein is the data reduction factor $\gamma$, which results from the relationship of $r_k$ to $r_{max}$:

$$\gamma = \frac{r_k}{r_{max}} = \frac{r_k \cdot c \cdot n_t}{f \cdot (1-\alpha)} \quad (7)$$

In a system with c=4 cameras, $\alpha=0.5$, f=1000 MHz, $r_k$=40 MHz and $n_t \geq 1000$ cycles per image point there results a data reduction factor of:

$$\gamma \geq 320. \quad (8)$$

This means that, for example, the information content of an image with originally one MByte storage requirement must be represented with a maximum of 3200 byte, before the computer can switch to further evaluation.

The searched information, that is, the coordinates of the marks to be measured, are strongly redundantly coded in the original gray image. In order to achieve the desired data reduction, various methods are employed:

a) Segmentation

On the plane of the gray value, the information of the image lies essentially in the transition area between the black background and the white-represented retro-reflected mark. It should thus be considered that the image should be segmented into information-carrying parts and unimportant parts. This occurs with this image type in the simplest case by a threshold formation with a subsequent dilation-operation, which enlarges the light areas with a predetermined edge breadth R. Thereby it is ensured that the entire edge of the image point is detected.

FIG. 1 shows in detail a) a typical measurement image of a situation with retro-reflected marks, recorded with a Dalsa CA-D6 high-speed camera. Besides the relatively large number of approximately 170 marks with a low camera resolution of 512×512 image points the proportion of the information carrying image points represents only 3 to 4%.

In part b) of FIG. 1 a histogram is shown of the occurring marking frequency per image cell as an average of 70 images similar to the scene in FIG. 1a). Maximally 22 marks per line were found, wherein the marks were newly counted for each line. Overall a total of maximally 176 marks were found in the entire image, on average there were 1.9 marks per line.

The surface area of the image which is covered by marks depends upon the mark diameter D, the edge breadth R and the number of marks $n_p$. According to the segmentation the data amount corresponds to the following number of bits:

$$V_s = n_b \cdot n_p \cdot \pi \cdot \left(\frac{D}{2} + R\right)^2 \quad (9)$$

Therein $n_b$ represents gray value for the bit depth. The compression factor $\gamma$ is produced as a quotient of the image size $\tilde{u} \cdot \tilde{v}$ and $V_s$:

$$\gamma_s = \frac{\bar{u} \cdot \bar{v} \cdot n_b}{V_s} = \frac{\bar{u} \cdot \bar{v}}{n_p \cdot \pi \cdot (D/2 + R)^2} \quad (10)$$

For an image size of 512×512 image points, $n_p$=170 marks with a mark diameter of D=9 image points as well as edge R of 2 image points there resulted a compression factor of $\gamma \approx 11.6$. This is 30 times less, lies close to the above approximation, is already sufficient in the case of a rapid camera to intermediately store the image stream for a subsequent image measurement.

b) Gray Value Compression

A further significant reduction in the data amount is produced by compression of the remaining gray values. This is particularly useful above all in combination with the above-described segmentation. Of course, this step is associated with losses. The extent to which this reduction methodology can be employed thus depends upon the degree of precision to be achieved in the subsequent image measurement. The maximal reduction results in the borderline case of binarization, that is, pixel values are only 0 (=dark) or 1 (=light).

The codification of the gray value from original gray value g to the compromised gray value $g_c$ occurs according to the following equation:

$$g_c = \begin{cases} 0 & \text{für } g < g_{min} \\ \left[\frac{g - g_{min}}{g_{max} - g_{min}} \cdot (2^{n_b} - 2) + 1\right] & \text{für } g_{min} \leq g \leq g_{max} \\ 2^{n_b} - 1 & \text{für } g > g_{max} \end{cases} \quad (11)$$

The rectangular brackets represent the rounding off to the next smaller whole number. The gray value domain to be coded is bordered by $g_{min}$ and $g_{mas}$. The compromise gray value $g_c$ then precisely has a code for the informationless area (namely the 0) and a code for the over-illuminated area, that is $2^{n_b}-1$. The remaining $2^{n_b}-2$ codes are essentially available for the remaining image information. It is particularly desirable to employ such a code when the light range of the images has no great significance.

The reduction factor which can be achieved by gray value compression is simply the relationship of the bit-depth $n'_b$ of the original data to the bit-depth of the compromised data:

$$\gamma \kappa = \frac{n'_b}{n_b} \quad (12)$$

In the binarization of a 12-bit deep image one achieves essentially a reduction by a factor of 12, and this only with a significant gray value loss of the image measurement.

The process, which represents a combination of the segmentation and the gray value compression, is described by OBERPAUL ("Dynamic 3D-Photogrammetrics", MessTec & Automation 8(1), 67, January 2000).

c) Image Measurement

The most efficient, however also most complex, reduction method is the image measurement itself. The essential information in the image is the parameter which characterizes the signal marks. For a robust description of the marks one requires more than just the middle point coordinates $\bar{u}$ and $\bar{v}$. Further useful dimensions are also the surface A and the circumference 1 of the marks, as well as the maximal gray value $g_{max}$ and the expansion along the coordinate axis $\Delta u$ and $\Delta v$. Of further interest would be the ellipse parameters, that is, the two ellipticity coefficients a and b. The amount of information corresponds approximately 66 bit per mark, as summarized in the following Table 1:

| Parameter | | Bits |
|---|---|---|
| $\bar{u}$ | coordinate | 12 |
|  | coordinate | 12 |
| $\Delta u$ | breadth | 5 |
| $\Delta v$ | height | 5 |
| A | surface area | 12 |
| 1 | circumference | 8 |
| $g_{mas}$ | max. gray value | 12 |
|  | Sum: | 66 |

The information requirement per image thus lies at:

$$V_m = n_p \cdot 66 \quad (13)$$

In the above-mentioned example of 170 marks this would be a total of 11220 bit or 1403 byes. The data reduction factor corresponds analogously to the above equation (10):

$$\gamma_m = \frac{\tilde{u} \cdot \tilde{v} \cdot n_b}{V_m} = \frac{\tilde{u} \cdot \tilde{v} \cdot n_b}{66 \cdot n_p} \quad (14)$$

In the example according to FIG. 1 one achieves a data reduction factor $\gamma_m \approx 187$. The higher the resolution of the camera, the more efficient the process.

For a camera with 1320×1024 image points and 12 bit gray value resolution there results already a factor $\gamma_m \approx 1450$.

d) Run Length Summation

An intermediate between the complexity of a complete image analysis and the above described image compromization is the line-by-line image measurement using run length summation. The data reduction presented to the computer therein considers respectively only one image point in the sequence as provided by the camera. The recognition of the domains extending beyond the lines occurs in the computer. In the following Table 2 the parameters are indicated, which are determinative in this process for further transmission to the computer:

| | | |
|---|---|---|
| $\Sigma$ g(u, v) | gray value sum | 16 |
| $\Sigma$ $\delta$u · g(u, v) | center point moment | 20 |
| $\delta$u | breadth | 5 |
| $g_{max}$ | maximal gray value | 12 |
| $\Delta$U | run length | 12 |
| | Sum: | 65 |

The sequence of the data reduction occurs here according to the following framework or routine:
1. As long as b(u,v)=0, place $\delta U = \delta U + 1$
2. Send $\delta U$ to the computer
3. As long as b(u,v)=1, calculate $\Sigma$ g(u,v), $\Sigma$ $\delta$u·g(u,v), and height $\delta$u as 1
4. Send all sums to the computer, place $\Delta U=0$ and begin again with 1.

Thereby a simple condition automation with only two conditions is implemented. The corresponding finite automation is represented in FIG. 2. The transition between the two conditions S0 and S1 is controlled by a value of the binary image b(u,v) on the actual image coordinates.

For each mark, which appears in an image line, 65 bit must be transmitted. The computer now only has the task of melding the sums of the marks of two sequentially lines with each other, when they have overlapping starting and ends points. For calculating the moments, one takes advantage of the fact that the line coordinates v over a line are constant. By the use of relative coordinate $\delta$u the breadth of the multiplier to be employed for data reduction can be significantly reduced and thereby many resources can be saved. If one calculates from the relative coordinates again back to the absolute values, then from these moments the characteristic parameters can be calculated.

An image recognition system for photogrammetric analysis of the center of gravity of signal points with data reduction is described in the U.S. Pat. No. 5,072,249. Therein the signals delivered by an analog video camera are first digitalized and subsequently submitted to a digital compression program or circuitry. In this program a data reduction occurs essentially according to the principle of run length summation as outlined above. A further evaluation is subsequently carried out by the computer CPU.

The present invention represents an advance beyond this image recognition system as the closest state of the art. It is concerned with the task of providing an improved system which makes possible a higher processing speed taking advantage of a new, further data reduction.

This task is solved by a process with the characteristics according to Claim 1. The characteristic features of an appropriate device for carrying out this inventive process are set forth in Claim 11. Further details of the invention and advantages of various embodiments can be seen from the features of the dependent claims. The inventive process and the corresponding device will be described in the following on the basis of the preferred embodiment. Therein there is shown in FIG. 1A a typical measurement image of a situation with retro-reflected marks, recorded with a Dalsa CA-D6 high-speed camera FIG. 1B a histogram of the occurring marking frequency per image cell FIG. 2 a simple finite condition automation with only two conditions FIG. 3 possible binary bit pattern with 2×2 pixel groups FIG. 4 a schematic representation of the coarse and switch conditions during the data reduction FIG. 5 image of the circular mark in a binarized digital image section or segment FIG. 6 block diagram of a digital circuit arrangement for data reduction FIG. 7 function sequence of the control automation in the circuit according to FIG. 6

Figure 6:
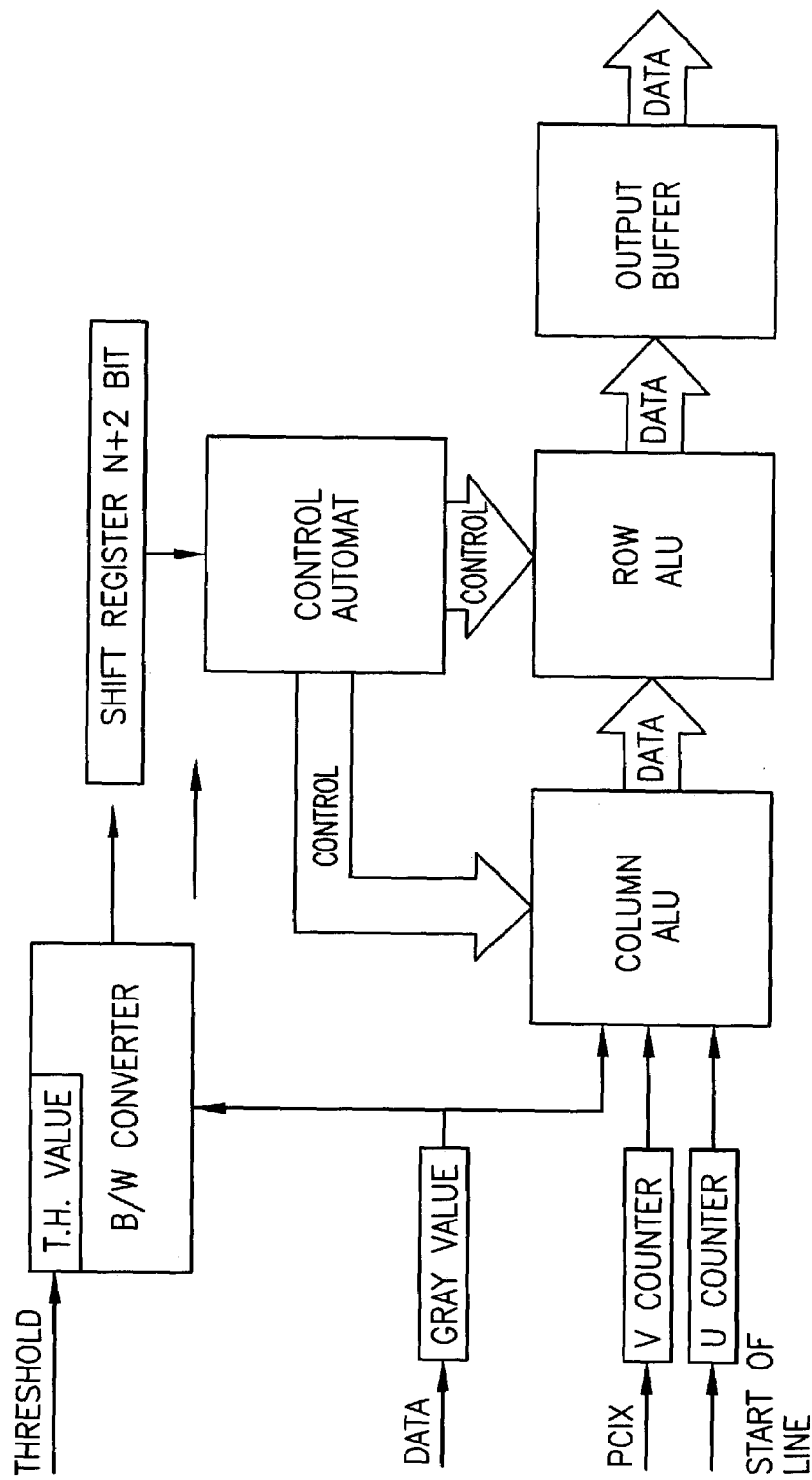
Figure 8:
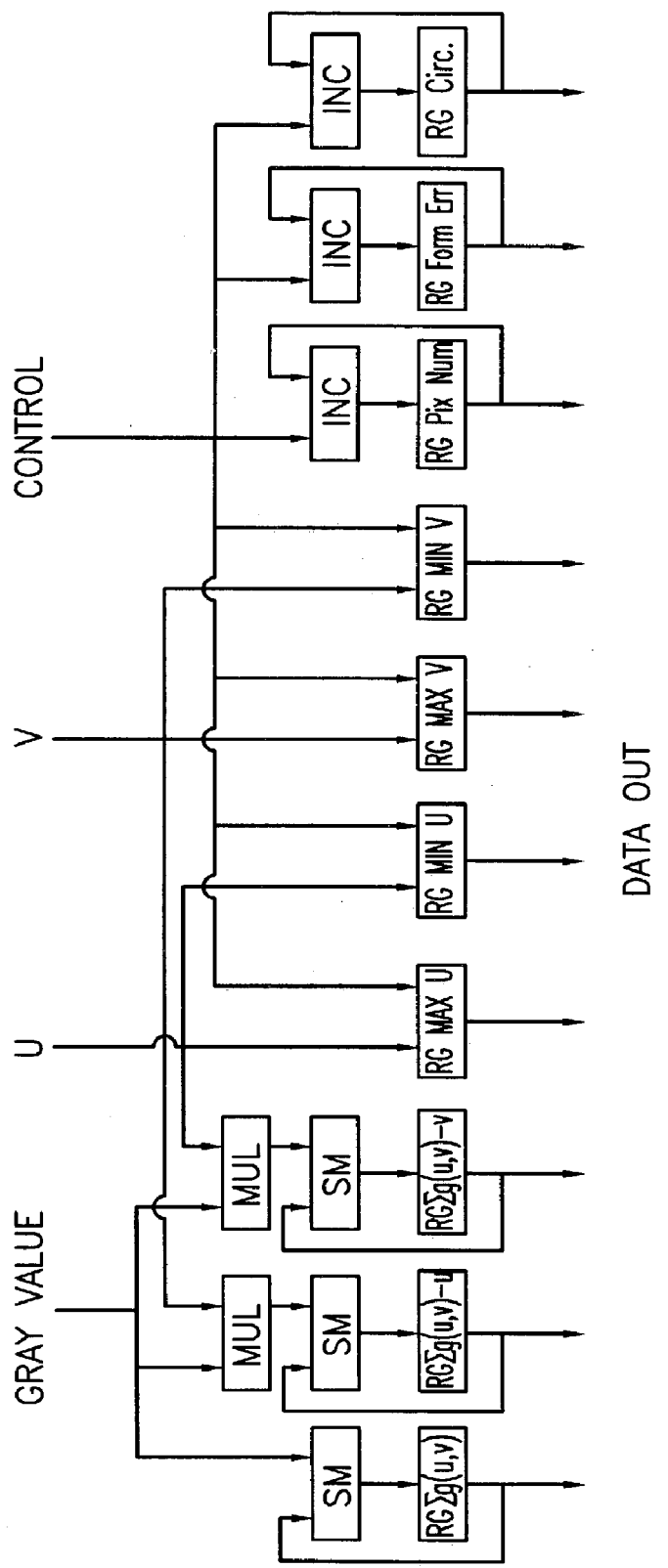

FIG. 8 design of the division or splitting ALU (Arithmetic Logic Unit) in FIG. 6

Figure 9:
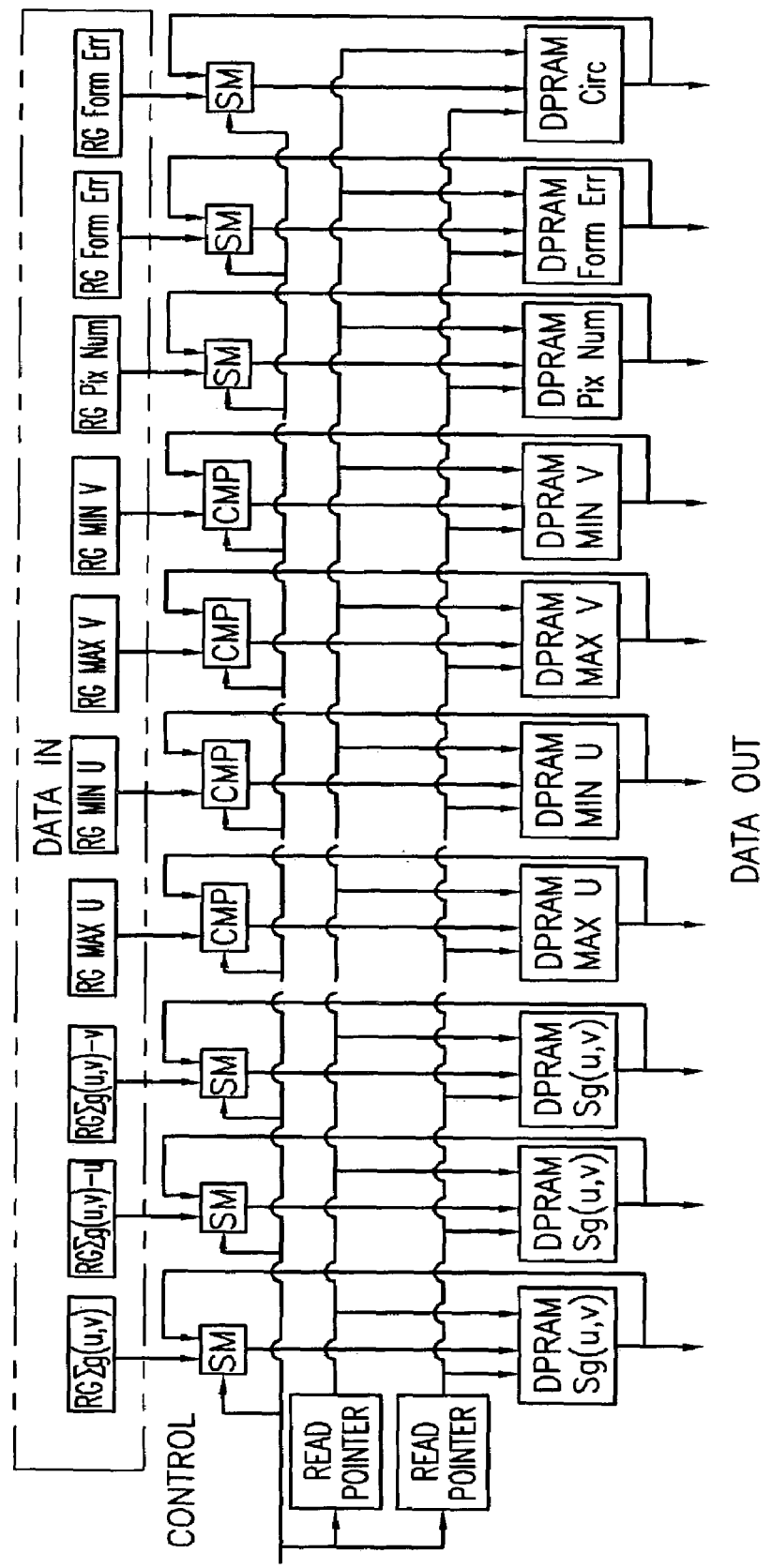

FIG. 9 design of the line ALU in FIG. 6

Figure 10:
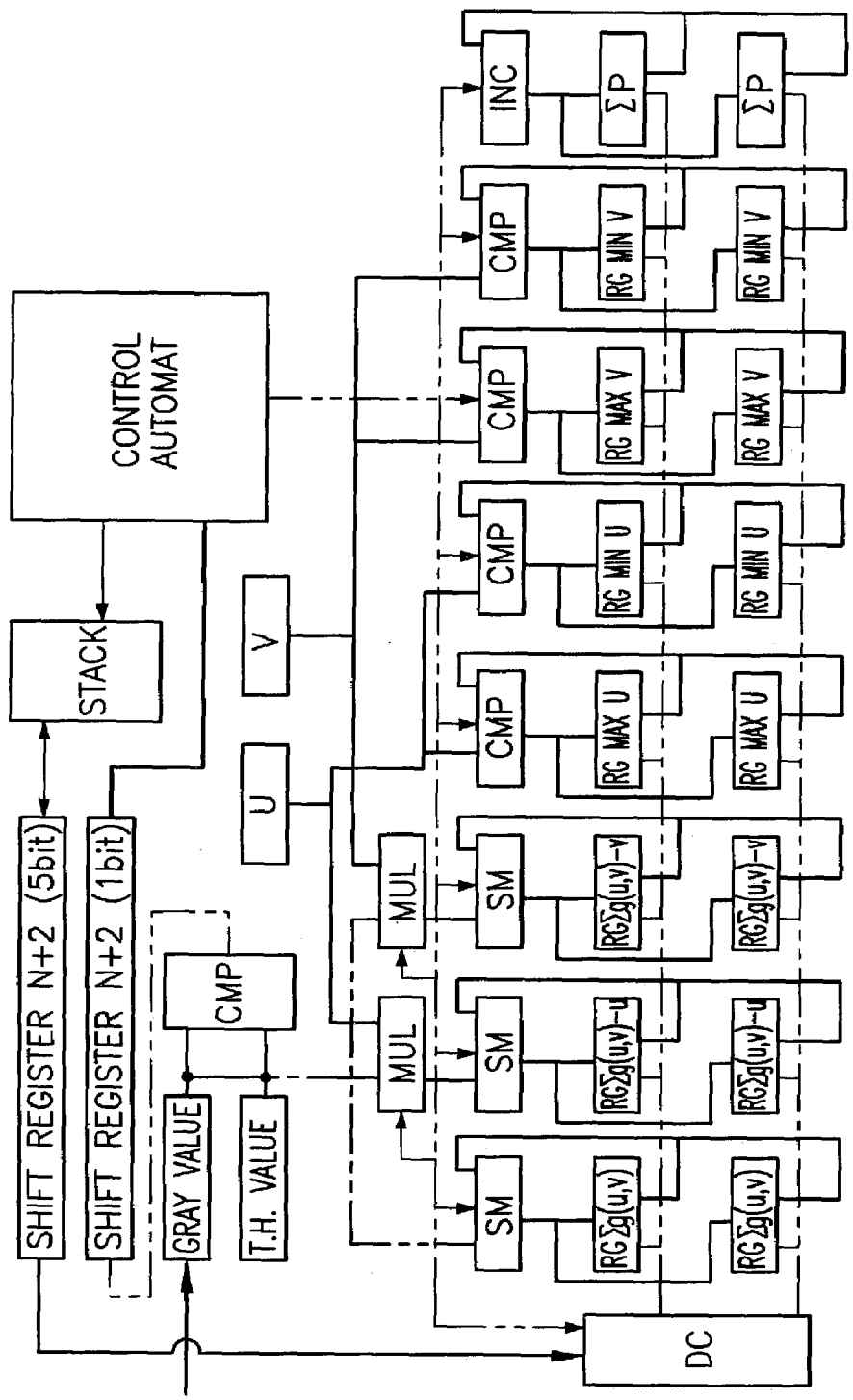

FIG. 10 alternative block diagram for calculating and intermediate storage of various output values.

The basic concept of the invention is the use of sequential image lines for a correlation analysis for data reduction prior to the actual further processing in a computer. Therein, groups of adjacent pixels extending outside the line are evaluated. These groups are predefined in lines and columns with an identical number and distribution of considered or evaluated pixels, for example, defined as n×m matrix.

In a binary image (that is, pixel values only 1 or 0) only specific constellations of the distribution of pixel values within a group are possible. These pixel patterns are identified and serve as control signal for the actual data reduction.

For the below-described preferred embodiment a simple 2×2 matrix is given as pixel group. For the correlation analysis according thereto two sequential lines of the binary image must always be analyzed. This requires the intermediate storage of ū+2 image points in the data shift register.

FIG. 3 shows the possible conditions of the binarized 2×2 four-neighborhood of pixels. The overall 16 various combinations are represented as binary numbers, which serve as input signal for an evaluation logic. Various pixel patterns thereby cause varying operations of the evaluation logic, which can be represented as the final automation.

Figure 4:
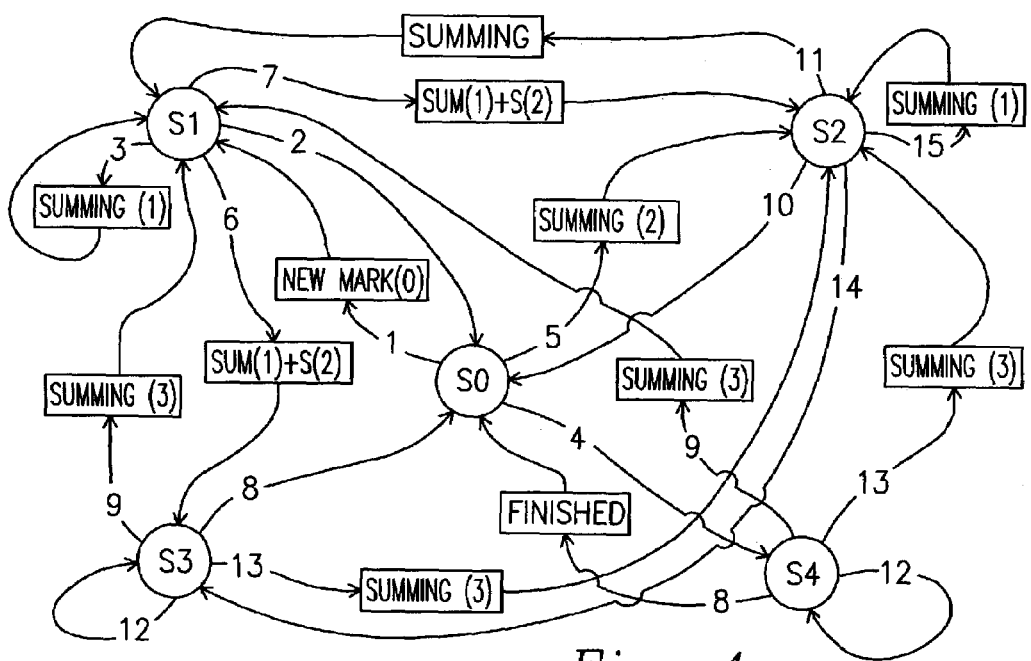

FIG. 4 shows a functional principle of the final automations for mark measurement. In the shown condition diagram, the illustrated circles symbolize the conditions, the arrows represent transitions. The number on the arrows refer to the pixel pattern according to FIG. 3, which respectively is determined or measured as a binary number in the input and triggers the transition.

The correlation analysis occurs via a register bank, of which the free addresses in a column are used. If the automation recognizes the start of a new mark, it retrieves the uppermost address from the column and begins with the summation of the moments in corresponding element of the register bank. At the same time it writes the number of the used register for each image column u, which is covered by the mark, in a data shift register from the length ū+2. If in the next line it arrives again at the same mark, it can recall the address in the register bank from the data shift register. Each transition triggers or causes a specific action of the automation. In the rectangular boxes in FIG. 4 the operations are indicated, which are initiated by the transition:

New Mark (x): Get the address of an empty register bank from the column and write the number in the data shift register position x and begin with summation.

Summation (x): Sum the moments in the register bank from the data shift register entry x.

S (x): Unite the moment in the register bank from the data shift register entry x with the actual bank.

Finish (x): Write the moment from the register, which is noted in the data shift register position x, in the output buffer.

The parameter x references respectively one double indirect access to a register bank. With x one of the four adjacent data shift register positions is indicated and from there the address which is necessary for the operation is read in the register bank.

The automation has a total of 5 conditions S0 . . . S4. In the line-by-line passage through of the image the automation recognizes on the base of the bit pattern in the observed neighborhood of four 4, whether this concerns a new mark (transition 1) or whether a mark was completely detected (transition 6). For overview of the manner of functioning, in FIG. 5 the enlarged image (20×20 pixel) of a circular shaped mark is represented, which in the following overview is sampled line-by-line, wherein the change in condition beginning with S0 is given in the automation:

| LINE | COLUMN | PATTERN | OPERATION | CHANGE IN CONDITION |
|---|---|---|---|---|
| 1/2 | 1/2 . . . 7/8 | 0 | / | S0 |
|  | 8/9 | 1 | new mark (0) | S0 -> S1 |
|  | 9/10 . . . 11/12 | 3 | summing (1) | S1 |
|  | 12/13 | 2 | / | S1 -> S0 |
|  | 13/14 . . . 19/20 | 0 | / | S0 |
| 2/3 | 1/2 . . . 5/6 | 0 | / | S0 |
|  | 6/7 | 1 | new mark (0) | S0 -> S1 |
|  | 7/8 | 3 | summing (1) | S1 |
|  | 8/9 | 7 | sum (1) + S (2) | S1 -> S2 |
|  | 9/10 . . . 11/12 | 15 | summing (1) | S2 |
|  | 12/13 | 11 | summing (1) | S2 -> S1 |
|  | 13/14 | 3 | summing (1) | S1 |
|  | 14/15 | 2 | / | S1 -> S0 |
|  | 15/16 . . . 19/20 | 0 | / | S0 |
| 3/4 same sequence of pattern, operation and condition as line 2/3 |
| 4/5 | 1/2 . . . 2/3 | 0 | / | S0 |
|  | 3/4 | 1 | new mark (0) | S0 -> S1 |
|  | 4/5 | 7 | sum (1) + S (2) | S1 -> S2 |
|  | 5/6 . . . 15/16 | 15 | summing (1) | S2 |
|  | 16/17 | 11 | summing (1) | S2 -> S1 |
|  | 17/18 | 2 | / | S1 -> S0 |
|  | 19/20 | 0 | / | S0 |
| 5/6 | 1/2 . . . 2/3 | 0 | / | S0 |
|  | 3/4 | 5 | summing (2) | S0 -> S2 |
|  | 4/5 . . . 16/17 | 15 | summing (1) | S2 |
|  | 17/18 | 10 | / | S2 -> S0 |
|  | 18/19 . . . 19/20 | 0 | / | S0 |
| 6/7 same sequence of pattern, operation and condition as line 4/5 |
| 7/8 same sequence of pattern, operation and condition as line 5/6 |
| 8/9 | 1/2 | 1 | new mark (0) | S0 -> S1 |
|  | 2/3 | 7 | Sum (1) + S (2) | S1 -> S2 |
|  | 3/4 . . . 17/18 | 15 | summing (1) | S2 |
|  | 18/19 | 10 | / | S2 -> S0 |
|  | 19/20 | 0 | / | S0 |
| 9/10 | /12 | 5 | summing (2) | S0 -> S2 |
|  | 3/4 . . . 17/18 | 15 | summing (1) | S2 |
|  | 18/19 | 11 | summing (1) | S2 -> S1 |
|  | 19/20 | 2 | / | S0 -> S1 |
| 10/11 same sequence of pattern, operation and condition as line 5/6 |
| 11/12 same sequence of pattern, operation and condition as line 5/6 |
| 12/13 | 1/2 | 4 | / | S0 -> S4 |
|  | 2/3 | 13 | summing (3) | S4 -> S2 |
|  | 3/4 . . . 17/18 | 15 | summing (1) | S2 |
|  | 18/19 | 14 | / | S2 -> S3 |
|  | 19/20 | 8 | / | S3 -> S0 |
| 13/14 same sequence of pattern, operation and condition as line 5/6 |
| 14/15 same sequence of pattern, operation and condition as line 12/13 |
| 15/16 same sequence of pattern, operation and condition as line 5/6 |
| 16/17 same sequence of pattern, operation and condition as line 12/13 |

. . . / . . .

Continuation:

| LINE | COLUMN | PATTERN | OPERATION | CHANGE IN CONDITION |
|---|---|---|---|---|
| 17/18 | 1/2 ... 3/4 | 0 | / | S0 |
|  | 4/5 | 4 | / | S0 -> S4 |
|  | 5/6 | 12 | / | S4 |
|  | 6/7 | 13 | summing (3) | S4 -> S2 |
|  | 7/8 ... 13/14 | 15 | summing (1) | S2 |
|  | 14/15 | 14 | / | S2 -> S3 |
|  | 15/16 | 12 | / | S3 |
|  | 16/17 | 8 | / | S3 -> S0 |
|  | 17/18 ... 19/20 | 0 | / | S0 |
| 18/19 | same sequence of pattern, operation and condition as line 17/18 | | | |
| 19/20 | 1/2 ... 8/9 | 0 | / | S0 |
|  | 9/10 | 4 | / | S0 -> S4 |
|  | 10/11 ... 11/12 | 12 | / | S4 |
|  | 12/13 | 8 | Finished (3) | S4 -> S0 |
|  | 13/14 ... 19/20 | 0 | / | S0 |

Figure 5:
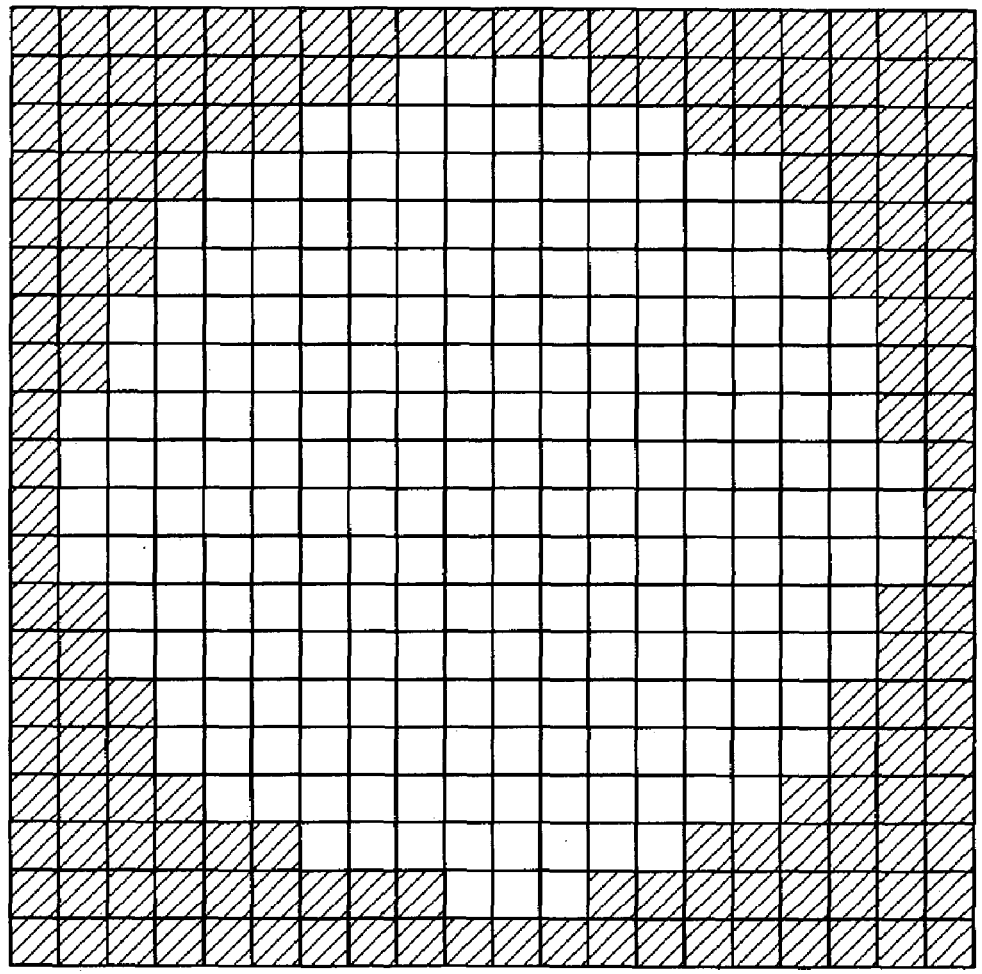

In this example of a function run or sequence no bit pattern of type "6" or "9" according to FIG. 4 occurred, since only a single, complete bordered mark is the sample, in which this constellation is not present (see FIG. 5). Pixel patterns of this type could result from a partial overlapping of two signal marks and lead to corresponding operations and transitions of the final automation (for example a pixel pattern "6" triggers the transition from S1 to S3 with operation sum(1)+S(2); pixel pattern "9" triggers either the transition from S3 to S1 or the transition from S4 to S4 with respective operation summing (3)). Therewith the final automation reliably also detects such transitions of two signal marks adjacent to each other in the image.

The introduced evaluation process for interline correlation analysis by means of final automation can be realized by an appropriately designed electronic circuit. In the following the manner of functioning of such an electronic circuit for measuring the center of gravity of optical signal marks will be described on the basis of the preferred embodiment according to FIG. 6.

The circuit works with digital input signals, for example directly from a digital camera, and provides the results of the evaluation at the output likewise in digital form. The circuit must therein solve multiple partial tasks: it must recognize the signal marks in the image, detect associated regions (segmentation) and calculate the associated moments, from which the image measurement can be deduced. For this it is subdivided into multiple function blocks, as shown in FIG. 6.

At the input of the circuit signals arrive, which are produced either by the camera or an external circuit. They are set forth in the following Table 3:

| Short name | Signal | Bits | Description |
|---|---|---|---|
| SoF | Start of Frame | 1 | Image start |
| SoL | Start of Line | 1 | Line start |
| PCLK | Pixel Clock | 1 | Clock signal for image point |
| Data | Pixel Data | 8–12 | Digital gray value |

The bit breadth of the digital gray values, which are fed in via the data lines, depend upon the camera which is to be used. Typically they are 8 or 12 bit. The Start-of-Frame (SoF) signal is used only for initialization of the circuit at the beginning of each image and is thus not shown in FIG. 6.

At the start of the circuit there is available information regarding the individual signal marks which were contained in the image. This information is an image measurement hypotheses, from which in a simple processing step, for example, from a subsequent software or a further electronic circuit, the actual image measurements can be deduced.

The moments determined by the circuit are indicated in Table 4:

| Name | Description |
|---|---|
| $\Sigma\, g$ | sum of the gray value |
| $\Sigma\, g \cdot u$ | moment of the u-coordinate |
| $\Sigma\, g \cdot v$ | moment of the v-coordinate |
| $\Sigma\, l$ | surface area |
| $\Sigma\, l\,(u \cdot v)$ | circumference |
| $\Delta u$ | breadth of the mark |
| $\Delta v$ | height of the mark |

From these moments then the image coordinates can be determined by conventional calculation processes. These coordinates are the actual image measurements in the photogrammetric sense. The other parameters are used only for recognition of reliable measurement. For example, the relationship of the circumference to surface area is a measurement for the roundness of the mark. Longer objects can thus easily be sorted out as erroneous measurements.

These subsequent actions also can be carried out with the aid of an electronic circuit or program (for example ASIC's). However the development expense therefore is relatively high and the need is low, since by this latter processing step the amount of data is hardly reduced.

The function blocks shown in FIG. 6 have the tasks described below:

There are certain global elements of which the signals can be made available for the other blocks. These are on the one hand the lines and column counters u-counter and v-counter, which produce the line and column numbers of the image from PClk, Start-of-Line and Start-of-Frame. Further, there is the B/W-converter, which compares the input gray value with a predetermined threshold value and provides at the output a binary version of the image. From the binarized signal there is intermediately stored precisely one image line plus two image points in a data shift register (shift register). From this data shift register the final automation (control automation) extracts its most important input signal. Alternatively to the binarization with a threshold value one could in this place also use the first derivative of the gray value along a line for this decision. If the difference of two adjacent gray values $g_1-g_2$ is smaller than one negative threshold value $-t$ then this concerns an ascending flank in the image and all following points are binarized as one. If the difference $g_1-g_2$ is greater than one positive threshold value $t$, then this is a descending flank in the image and the subsequent gray value is binarized as 0. This form of binarization is more robust in comparison to the optical image caused light intensity oscillation of the image (for example vignetting or shading).

The control automation (finite state machine) has a fixed predetermined number of 5 conditions S0. . . S4, which depend both on the input signal from the data shift register as well as also from the previous condition. For each condition a characteristic pattern of output signals is produced (control) which serve for the control of the individual circuit elements.

The automation is thus the "brain" of the circuit. Essentially it analyzes as described above the condition of four direct adjacent binarized image points from two sequential image lines. These four image points can represent the 16 different combinations, as shown in FIG. 3. From the analysis of this pixel pattern the actions are deduced or inferred, which the other circuit blocks are carry out. Thus for example a white point in the right lower element of a neighborhood of four (=pixel pattern 1) represents the start of a new mark.

Figure 7:
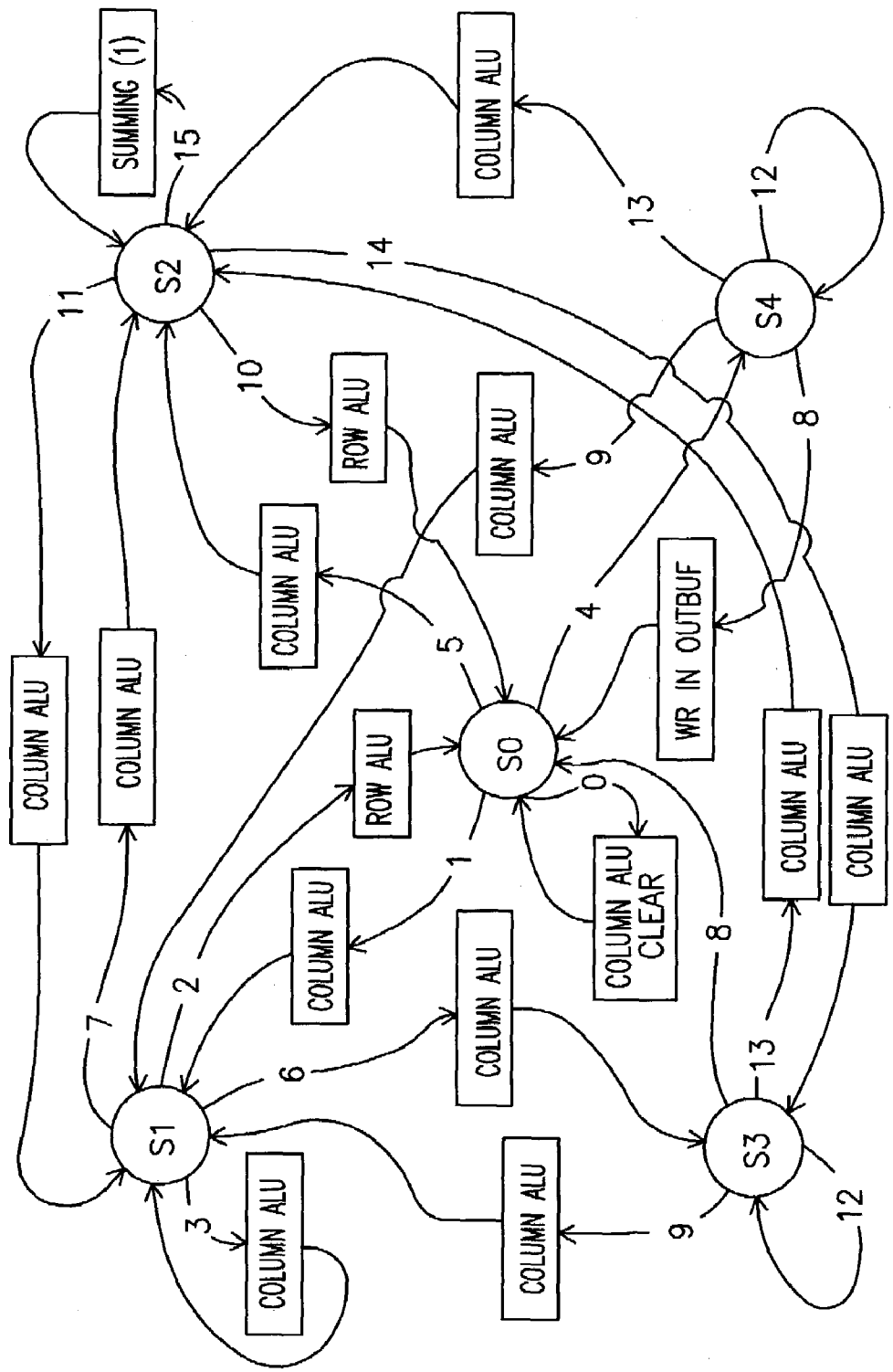

The structure of the function sequence of the final automation as control unit in this circuit design is shown in FIG. 7. In the shown circuit example, from the final (control automation) two arithmetic logic units (ALU) are controlled, which can carry out simple arithmetic operations (addition, subtraction, multiplication, exclusive-or). The design of the column-ALU is shown in FIG. 8. The column-ALU calculates and stores the moments for each mark in an image line and provides the result to the line-ALU. For this it sums the moments for sequential light image points in one line. If in the binary image a transition from light to dark occurs, then all registers in the line-ALU are transmitted.

The design of the line-ALU is shown in FIG. 9. The shown DATA IN register is identical with that in FIG. 8. The line-ALU combines the sums from two different sequential lines. For this it requires a ring-buffer (dual ported RAM), in which all candidates from the previous line are intermediately stored. The values calculated from the column-ALU are compared with those which are intermediately stored in the ring-buffer and added if they originate from image areas which connect. This decision is made by the final automation on the basis of the observed neighborhood. The result is either written again in the ring buffer for the next line or, in the case that the automation recognizes that a mark has been completely detected, is transmitted to the output buffer.

The output buffer assumes the approximately 142 bit wide information stream from the line-ALU and serializes it, so that it can be transmitted to the output storage with the correct word breadth. From this storage a connected computer can take over the data and carry out the subsequent calculation for the image measurement.

The introduced or upstream data reduction by means of final automation can be realized in various ways as electronic circuit, is however not limited to the embodiment shown and described on the basis of FIG. 6. Accordingly FIG. 10 shows a somewhat modified circuit diagram, which likewise achieves the described data reduction by means of a final automat.

In similar manner the data reduction can be implemented using Field Programmable Gate Arrays (FPGA). In the case of FPGAs this concerns variable employable logical circuit loops, which are constructed of a plurality of corresponding logic blocks (CLBs). They have access to free programmable input and output, whereby they are employable in multiple applications independently of pin setting and transmission protocols. Typically employable are network routers and mobile radiotelephones. The programming occurs in built-in condition during the running operation and can be changed as often as desired up to 100 times per second. For frequent tasks, such as for example the connecting to a PCI-Bus, finished program blocks are available commercially, which relieves the developer of a large part of the implementation workload. The programming of the building blocks usually occurs in a hardware description language such as HDL (Hardware-Definition-Language), VHDL (Very Large Scale Integrated Circuit-HDL, for example VLSI-HDL) or AHDL (Applications Specific Integrated Circuit HDL, for example ASIC-HDL).

In the development of such a system it is to be taken into consideration that the expense for the development of a VHDL-Programming with lower flexibility is substantially higher than with a software solution. It is thus important to select the intersection or interface between hardware and software components of the solution, so that the end product runs sufficiently quickly with minimal development costs.

The above described data reduction with the center of gravity determination of optical signal markers by means of interline correlation analysis by pattern dependent condition changes of an endless automation is very robust against disturbance or interference and can even measure non-convex areas. In general only a few parameters are required, so that the processing speed is correspondingly high. Because of the serial manner of operating also a parallelization by simultaneous evaluation of different collated partial areas of an image are possible. While this may necessitate an exception handling on the borders of the partial areas, nevertheless the processing speed can therewith be increased, using digital electronics available today, to approximately 500 million image points per second. Therewith this technique is also employable in the high-speed area.

The invention claimed is:

1. A process for photogrammetric determination of the center of gravity of optical signal marker in a moving object, comprising:
   recording the object via a video camera and supplying the electronic image signal as line-by-line sequence of digitized image points (pixels) to a digital processing unit for data reduction, and
   transmitting the output signals to a computer for further processing,
   wherein, for data reduction, groups of adjacent pixels of sequential image cells are sequentially correlated as an n×m matrix and evaluated.

2. A process according to claim 1, wherein the groups are assembled as a 2×2 matrix.

3. A process according to claim 1, wherein each group of adjacent pixels is evaluated to the extent that a characteristic pattern of the distribution of the pixel values in terms of lines and columns of the matrix can be identified.

4. A process according to claim 3, wherein each identified pattern triggers an individual control signal.

5. A process according to claim 4, wherein the control signal is supplied as the input signal of an evaluation logic, which is designed as final automation with a finite number of conditions.

6. A process according to claim 5, wherein the final automation carries out states or condition changes depending upon the actual status or condition and input signal.

7. A process according to claim 6, wherein the final automation controls all operations of the digital processing unit for data reduction.

8. A process according to claim 1, wherein as the initial signal of the digital processing unit for each signal mark, there is further conveyed for further processing in a computer
   the sum of all pixel values belonging to the signal mark,
   indications of the position of the signal mark in the image,
   surface area of the signal mark,
   the circumference of the signal mark,
   the breadth of the signal mark and
   the height of the signal mark as digital numeric values.

9. A process according to claim 1, wherein the image signal supplied by the video camera prior to the data reduction in the digital processing unit is reduced to a limited number of gray values.

10. Process according to claim 9, wherein in one image cell the differential value of the gray value of adjacent pixels are compared with a predetermined threshold value and in the case of a differential value smaller than the negative threshold value the gray of subsequent pixels are assigned a digital value "1", and in the case of differential value greater than the positive threshold value the are assigned a digital value "0".

11. A device for photogrammetric determination of the threshold value of optical signal marks of moving objects by means of the process, said device including means for recording the object via a video camera and supplying the electronic image signal as line-by-line sequence of digitized image points (pixels) to a digital processing unit for data reduction, and means for transmitting the output signals to a computer for further processing, wherein, for data reduction, groups of adjacent pixels of sequential image cells are sequentially correlated as an n×m matrix and evaluated, and wherein the digital processing unit further includes means for intermediate storage of at least one image cell, as well as a control unit, in which sequential image cell groups of adjacent pixels are assembled or combined as n×m-matrix sequentially and evaluated as control signals, as well as means, which are controlled by the control unit and further transmit the output signals to a computer.

12. A device according to claim 11, wherein said device further includes a means for reducing the image signal supplied by the video camera to a limited number of gray values.

13. A device according to claim 11, wherein the means controlled by the control unit represents arithmetic logic units.

14. A device according to claim 11, wherein a field programmable gate array (FPGA) or ASIC is employed for components of the digital processing unit.

* * * * *